UNITED STATES PATENT OFFICE.

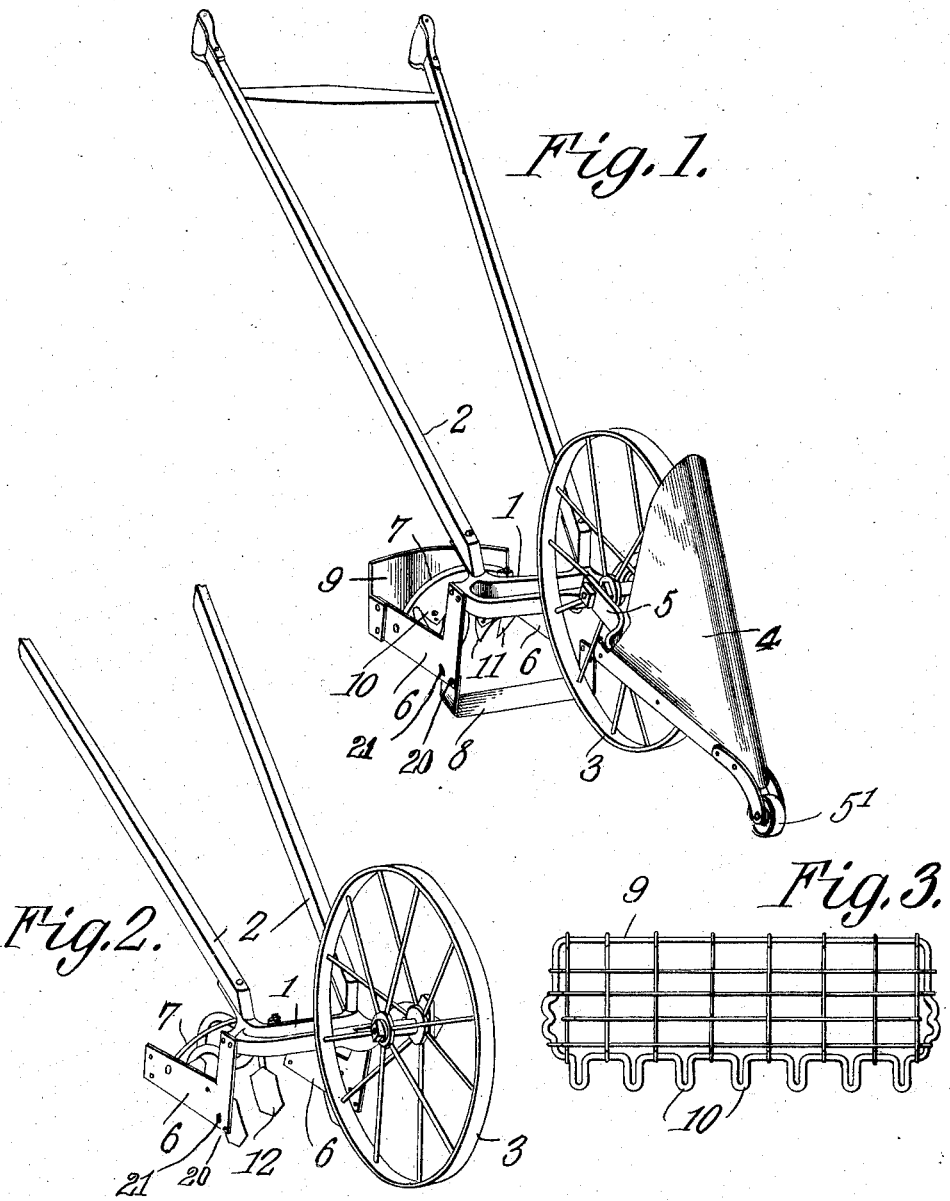

MARCELLUS RAMSEY, OF NORTH GIRARD, PENNSYLVANIA.

WHEEL-HOE.

No. 878,561.  Specification of Letters Patent.  Patented Feb. 11, 1908.

Application filed March 23, 1907. Serial No. 364,139.

*To all whom it may concern:*

Be it known that I, MARCELLUS RAMSEY, a citizen of the United States, residing at North Girard, in the county of Erie and State of Pennsylvania, have invented a new and useful Wheel-Hoe, of which the following is a specification.

This invention has relation to wheel hoes and it consists in the novel construction and arrangement of its parts as hereinafter shown and described.

The object of the invention is to provide an implement of the character indicated which is adapted to be manually operated for the purpose of weeding or cultivating a growing crop.

The implement consists primarily of a frame which is supported by a wheel and which is provided with the usual operating handles. A hood attachment of special construction is provided to be placed over the single wheel of the implement when used as a hoe to prevent foliage and trash from becoming entangled in the spokes thereof. Standards are provided at the sides of the frame and are adapted to carry a blade or digger and the said standards are provided with rearward extensions which may be connected together by a basket. A bail is also employed for holding the rearward extensions of the standards at proper distances apart when the said basket is removed. The said basket is provided with gathering tines. When the basket is removed cultivator shovels may be attached to the frame and located between the standards, the said standards preventing the cultivator blades from throwing the earth to the side to such an extent as to cover small plants.

In the accompanying drawings:—Figure 1 is a perspective view of one form of the invention showing a hood located over the supporting wheel thereof. Fig. 2 is a perspective view of the same with the hood removed. Fig. 3 is a front elevation of a modified form of basket.

The frame 1 is provided with the handles 2 and is supported by a ground wheel or wheels 3. The hood 4 may be located over the wheel 3 and is provided with the bars 5 which are attached to the axle of the wheel as shown in Fig. 1. The forward end of the hood 4 is supported by the roller 5'. The standards 6 depend from the frame 1 and in the form of the invention as shown in Figs. 1 and 2 are provided with the rearward extensions which are connected together by the bail 7. A blade 8 is located at the forward portions of the said standards and a basket 9 may be applied to the rear ends of the said standards. Said basket may be made of sheet metal as shown in Fig. 1 or may be formed of woven wire as shown in Fig. 3. The lower edge of the basket 9 is provided with the eyes 10 which are adapted to receive bolts by means of which the gathering tines 11 are secured to the said basket.

In the form of the invention as shown in Fig. 2 the blade 8 and the basket 9 are removed and the cultivator shovels 12 are attached to the frame 1 and located between the standards 6. The blade 8 is pivotally attached to the standards 6 by means of the bolts 20 and is provided with the pins which lie in the arcuate slots 21. By this arrangement it is possible to tilt the said blade axially in order that it may be presented to the ground at a desired angle.

Having described my invention what I claim as new and desire to secure by Letters-Patent is:—

1. An implement as described comprising a frame, a wheel supporting the same, means for propelling the frame, an earth engaging blade carried by the frame, a hood supported upon the frame and passing over the forward portion of the supporting wheel.

2. An implement such as described comprising a frame, a wheel supporting the same, means for propelling the implement, an earth engaging blade carried by the frame, a hood pivotally attached to the frame and extending over the forward portion of the supporting wheel.

3. An implement such as described comprising a frame, a wheel supporting the same, means for propelling the implement, standards attached to the frame, an earth engaging blade carried by the standards and a bail connecting the standards together.

4. An implement such as described comprising a frame, a wheel supporting the same, means for propelling the implement, earth engaging elements, standards attached to the frame and a bail connecting the standards together.

5. An implement such as described comprising a frame, a wheel supporting the same, means for propelling the implement, standards attached to the frame, a blade adjustably pivoted to the standards and a bail connecting the standards together.

6. An implement such as described comprising a frame, a wheel supporting the same, means for propelling the implement, standards depending from the frame, a blade attached to the standards, a bail connecting the standards together and a basket attached to the standards.

In testimony that I claim the foregoing as my own, I have hereto affixed my signature in the presence of two witnesses.

MARCELLUS RAMSEY.

Witnesses:
H. E. DENIO,
ADELBERT WARD.